United States Patent
Diaz et al.

(10) Patent No.: US 10,380,158 B2
(45) Date of Patent: *Aug. 13, 2019

(54) SYSTEM FOR DETERMINING AND OPTIMIZING FOR RELEVANCE IN MATCH-MAKING SYSTEMS

(71) Applicant: MATCH GROUP, LLC, Dallas, TX (US)

(72) Inventors: Fernando Diaz, San Francisco, CA (US); Donald Metzler, Los Angeles, CA (US); Sihem Amer-Yahia, New York, NY (US)

(73) Assignee: MATCH GROUP, LLC, Dallas, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/231,181

(22) Filed: Aug. 8, 2016

(65) Prior Publication Data

US 2016/0342684 A1 Nov. 24, 2016

Related U.S. Application Data

(63) Continuation of application No. 12/829,152, filed on Jul. 1, 2010, now Pat. No. 9,449,282.

(51) Int. Cl.
*G06F 16/00* (2019.01)
*G06F 16/335* (2019.01)
(Continued)

(52) U.S. Cl.
CPC ........ *G06F 16/337* (2019.01); *G06F 16/9535* (2019.01); *G06N 5/048* (2013.01); *G06N 7/005* (2013.01); *G06N 20/00* (2019.01)

(58) Field of Classification Search
CPC ......... G06F 17/30864; G06F 17/30867; G06F 17/30648; G06F 17/30687;
(Continued)

(56) References Cited

U.S. PATENT DOCUMENTS 6,735,568 B1 5/2004 Buckwalter
7,203,674 B2 4/2007 Cohen
(Continued)

OTHER PUBLICATIONS

K. Balog, "People Search in the Enterprise", PhD Thesis, University of Amsterdam, Jun. 2008, 1 pg.
(Continued)

*Primary Examiner* — Michelle N Owyang
(74) *Attorney, Agent, or Firm* — Patent Capital Group (57) ABSTRACT

Disclosed are methods and apparatus for automatically determining the relevance of matches between entities. A set of one or more indicators of relevance for each of a plurality of matches may be detected, where each of the plurality of matches exists between a first entity and a different one of a plurality of entities. Each set of one or more indicators of relevance indicates a degree of two-way interest for a corresponding one of the plurality of matches, the degree of two-way interest indicating both a degree of interest of the first entity in the corresponding one of the plurality of entities and a degree of interest of the corresponding one of the plurality of entities in the first entity. A probability of relevance of each of the plurality of matches may be determined based at least in part upon a corresponding set of one or more indicators of relevance. Each of the plurality of matches may be ranked based at least in part on the corresponding probability of relevance. A ranking function may be trained based upon the probability of relevance of each of the plurality of matches. The ranking function may subsequently be applied to identify and rank matches (e.g., in the absence of indicators of relevance).

14 Claims, 5 Drawing Sheets

(51) Int. Cl.
*G06N 20/00* (2019.01)
*G06F 16/9535* (2019.01)
*G06N 5/04* (2006.01)
*G06N 7/00* (2006.01)

(58) Field of Classification Search
CPC ........... G06F 17/30702; G06F 16/9535; G06F 16/24578; G06F 16/337; G06F 16/00
USPC .................................................. 707/705–780
See application file for complete search history.

(56) References Cited

U.S. PATENT DOCUMENTS

| | | | |
|---|---|---|---|
| 7,730,030 B1 | 6/2010 | Xu | |
| 7,739,231 B2 | 6/2010 | Flinn et al. | |
| 7,882,039 B2 | 2/2011 | Weiss et al. | |
| 8,055,546 B1 | 11/2011 | Cassone et al. | |
| 8,583,639 B2* | 11/2013 | Chitnis | G06F 16/951 707/728 |
| 8,719,298 B2 | 5/2014 | Konig et al. | |
| 2002/0040310 A1 | 4/2002 | Lieben et al. | |
| 2002/0107853 A1* | 8/2002 | Hofmann | G06F 16/335 |
| 2002/0178163 A1 | 11/2002 | Mayer | |
| 2003/0078976 A1 | 4/2003 | Gordon | |
| 2006/0136589 A1 | 6/2006 | Konig et al. | |
| 2007/0112764 A1* | 5/2007 | Yih | G06F 17/241 |
| 2007/0156514 A1 | 7/2007 | Wright | |
| 2007/0203908 A1* | 8/2007 | Wang | G06F 16/951 |
| 2007/0255689 A1 | 11/2007 | Sun et al. | |
| 2008/0027912 A1* | 1/2008 | Liu | G06F 16/3346 |
| 2008/0097822 A1* | 4/2008 | Schigel | G06Q 10/063 705/7.33 |
| 2008/0214153 A1 | 9/2008 | Ramer et al. | |
| 2009/0049127 A1 | 2/2009 | Juan et al. | |
| 2009/0157523 A1 | 6/2009 | Jones et al. | |
| 2009/0319507 A1 | 12/2009 | Chen et al. | |
| 2010/0042608 A1 | 2/2010 | Kane | |
| 2010/0293057 A1 | 11/2010 | Haveliwala et al. | |
| 2010/0332270 A1 | 12/2010 | Richter et al. | |
| 2011/0184958 A1 | 7/2011 | Krishnamoorthy et al. | |
| 2012/0005204 A1 | 1/2012 | Diaz et al. | |

OTHER PUBLICATIONS

B. Carterette, et al., "Evaluating Search Engines by Modeling the Relationship Between Relevance and Clicks", In NIPS, 2007, 8 pgs.

K. Chakrabarti, et al., "Efficient Query Refinement in Multimedia Databases", In ICDE '00: Proceedings of the 16th International Conference on Data Engineering, p. 196, Washington, DC, USA, 2000, IEEE Computer Society, 20 pgs.

O. Chapelle, et al., "Expected Reciprocal Rank for Graded Relevance", In CIKM '09: Proceeding of the 18th ACM Conference on Information and Knowledge Management, 2009, 10 pgs.

O. Chapelle, et al., "A Dynamic Bayesian Network Click Model for Web Search Ranking", In WWW '09: Proceedings of the 18th International Conference on World Wide Web, New York, NY, USA, 2009, ACM, 10 pgs.

S. Chaudhuri, et al., "Probabilistic Ranking of Database Query Results", In VLDB '04: Proceedings of the Thirtieth International Conference on Very Large Data Bases, VLDB Endowment, 2004, 12 pgs.

S. Chaudhuri, et al., "Probabilistic Information Retrieval Approach for Ranking of Database Query Results", ACM Trans. Database Syst., 31(3):1134-1168, 2006, 43 pgs.

N. Craswell, et al., "An Experimental Comparison of Click Position-Bias Models", In WSDM '08: Proceedings of the International Conference on Web search and Web Data Mining, pp. 87-94, New York, NY, USA, 2008, ACM, 8 pgs.

J. H. Friedman, "Greedy Function Approximation: A radient Boosting Machine", The Annals of Statistics, 29(5):1189-1232, 2001, 34 pgs.

D. Gale, et al., "College Admissions and the Stability of Marriage", The American Mathematical Monthly, 69(1 ):9-15, Jan. 1962, 7 pgs.

G. Hitsch, et al., "What Makes you Click? An Empirical Analysis of Online Dating", 2005 Meeting Papers 207, Society for Economic Dynamics, 2005, 51 pgs.

G. Hitsch, et al., "Matching and Sorting in Online Dating Markets", American Economic Review, 2010, 34 pgs.

J. Kim, et al., "A Probabilistic Retrieval Model for Semistructured Data", In ECIR '09: Proceedings of the 31th European Conference on IR Research on Advances in Information Retrieval, pp. 228-239, Berlin, Heidelberg, 2009, Springer-Verlag, 12 pgs.

J. Kleinberg, "The Small-World Phenomenon: An algorithmic Perspective", In Proceedings of the 32nd ACM Symposium on Theory of Computing, pp. 163-170, 2000, 14 pgs.

V. Lavrenko, et al., "Information Retrieval on Empty Fields", In Human Language Technologies 2007: The Conference of the North American Chapter of the Association for Computational Linguistics; Proceedings of the Main Conference, pp. 89-96, Rochester, New York, Apr. 2007, Association for Computational Linguistics, 8 pgs.

J. Li, et al., "A Unified Approach to Ranking in Probabilistic Databases", PVLDB, 2(1):502-513,2009,12 pgs.

M. Ortega-Binderberger, et al., "An Approach to Integrating Query Refinement in SQL", In EDBT '02: Proceedings of the 8th International Conference on Extending Database Technology, pp. 15-33, London, UK, 2002, Springer-Verlag, 19 pgs.

D. Petkova, et al., "Refining Keyword Queries for XML Retrieval by Combining Content and Structure", In ECIR '09: Proceedings of the 31th European Conference on IR Research on Advances in Information Retrieval, pp. 662-669, Berlin, Heidelberg, 2009, Springer-Verlag, 8 pgs.

F. Radlinski, et al., "How Does Clickthrough Data Reflect Retrieval Quality?", In CIKM '08: Proceeding of the 17th ACM Conference on Information and Knowledge Management, pp. 43-52, New York, NY, USA, 2008, ACM, 10 pgs.

R. Ranganath, "It's Not You, It's Me: Detecting Flirting and Its Misperception in Speed-Dates", In Proceedings of the 2009 Conference on Empirical Methods in Natural Language Processing, pp. 334-342, Singapore, Aug. 2009, Association for Computational Linguistics, 9 pgs.

L. Wu, et al., "Falcon: Feedback Adaptive Loop for Content-Based Retrieval", In VLDB '00: Proceedings of the 26th International Conference on Very Large Data Bases, pp. 297-306, San Francisco, CA, USA, 2000, Morgan Kaufmann Publishers Inc., 10 pgs.

X. Yi,, et al., "Matching Resumes and Jobs Based on Relevance Models", In SIGIR '07: Proceedings of the 30th annual International ACM SIGIR Conference on Research and Developmnt in Information Retrieval, pp. 809-810, New York, NY,; USA, 2007, ACM, 2 pgs.

Z. Zheng, et al., "A General Boosting Method and Its Application to Learning Ranking Functions for Web Search", In J. Platt, D. Koller, Y. Singer, and S. Roweis, editors, Advances in Neural Information Processing Systems 20, pp. 1697-1704, MIT Press, Cambridge, MA, 2008, 8 pgs.

* cited by examiner

| | |
|---|---|
| phone_exchange | users both exchanged phone numbers |
| email_exchange | users both exchanged email addresses |
| regexp_match | users both exchanged information about meeting |
| num_exchanges | number exchanges between users |
| message_orphan | one user sent a message without a reply |
| message_disparity | difference in number of messages exchanged between users |
| exchange_timespan | duration of the message exchanges between users |
| message_density | the density of exchanges between the first and last messages exchanged |
| skip | one user saw the other's profile and did not send a message |
| num_view_exchanges | number profile views exchanged between users |
| view_orphan | one user viewed another's profile and was not also viewed |
| view_disparity | difference in number of views exchanged between users |
| view_titmespan | duration of views between users |
| view_density | the density of views between the first and last messages exchanged |

SYSTEM FOR DETERMINING AND OPTIMIZING FOR RELEVANCE IN MATCH-MAKING SYSTEMS

This Application is a continuation (and claims the benefit of priority under 35 U.S.C. § 120) of U.S. application Ser. No. 12/829,152, filed on Jul. 1, 2010 and entitled SYSTEM FOR DETERMINING AND OPTIMIZING FOR RELEVANCE IN MATCH-MAKING SYSTEMS. The disclosure of the prior Application is considered part of and is incorporated by reference in the disclosure of this Application.

BACKGROUND OF THE INVENTION

The disclosed embodiments relate generally to methods and apparatus for determining or predicting the relevance of matches between entities.

Match-making systems refer to systems that enable users to meet other users to satisfy a particular need. Many match-making systems exist today including dating services, resume/job bulletin boards, community-based question answering systems, and consumer-to-consumer marketplaces. One fundamental component of match-making systems is the retrieval and ranking of candidate matches for a given user.

Typically, in a match-making system, each user is associated with a profile that includes general information about the user. For example, in an online dating service, the profile may include the user's location, physical attributes (e.g., hair color), age, and gender. On a job seeking site, the profile may contain the job seeker's education, years of experience, and desired salary range. It is also common for users of these systems to be able to define the attributes they would like matches to satisfy. In match-making systems, these are often called target profiles. In information retrieval terminology, the target profile can be considered the user's information need, or query.

Despite the popularity of such systems, match-making systems often provide matches that are based solely on the target profile, yielding results that are less than optimal. As a result, the users of such systems are often unsatisfied with these match-making systems.

SUMMARY OF THE INVENTION

The disclosed embodiments enable a plurality of matches to be identified and ranked in a match-making system. This may be accomplished through the application of various features, which may include behavioral features of parties to a potential match. While click-through data has traditionally been used in various online systems, the disclosed embodiments provide a number of behavioral features that may be used to determine relevance in a match-making context.

In one embodiment, the probability of relevance (i.e., predicted relevance) of a plurality of matches for a particular entity (e.g., querying entity) may be determined based at least in part on one or more of a plurality of behavioral features, where each of the matches is defined by a pair of entities including the querying entity and one of a plurality of entities. Based upon the probability of relevance for each of the plurality of matches, the plurality of matches may be ranked. At least a subset of the ranked matches may then be provided to the querying entity.

In another embodiment, the behavioral features may be indicative of one-way and/or two-way interactions (or lack thereof) between two entities. For example, the behavioral features may pertain to the viewing of profiles, sending of messages, responding to messages, etc.

In another embodiment, the probability of relevance for each of the plurality of matches may be used to ascertain parameters of a ranking function. In addition, each of the matches may be assigned a weight based upon the probability of relevance and source of the features used to calculate the probability of relevance. The ranking function may then be "trained" and used to identify and rank matches for another query and/or different querying entity (e.g., for which behavioral features may be absent).

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
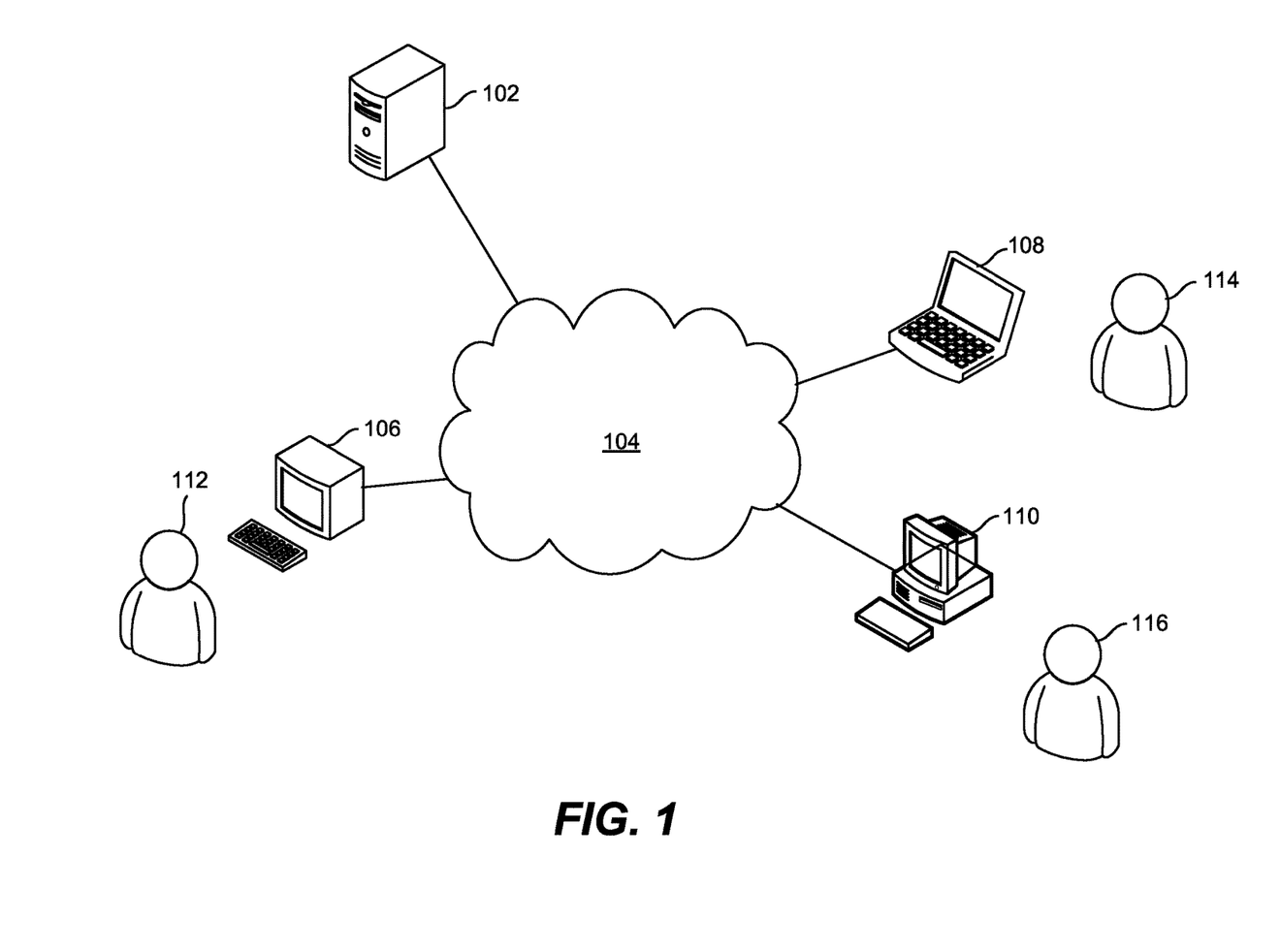
FIG. 1 is a diagram illustrating an example system in which embodiments of the invention may be implemented.

FIG. 1 is a diagram illustrating an example system in which embodiments of the invention may be implemented. As shown in FIG. 1, the system may include one or more servers 102 associated with a match-making web site. Specifically, the server(s) 102 may enable the web site to automatically generate and/or rank matches between entities. For example, an entity may be an individual, a set of individuals (e.g., company or other group), or a web site. In this example, the server(s) 102 may obtain or otherwise receive data (e.g., profiles) and/or requests (e.g., search requests and/or target profiles) via the Internet 104 from one or more computers 106, 108, 110 in association with corresponding entities 112, 114, 116, respectively.

The server(s) 102 may enable the entities 112, 114, 116 to generate and/or modify a profile that defines or represents features of that entity. The profile may be available to the general public, to those that are members of the web site, and/or to a specific category of those members of the web site. For example, each of the entities 112, 114, 116 may be an individual, a group of individuals (e.g., group, business or company), or other entity such as a web site. Each entity may thereafter request, receive, and/or view their matches (e.g., in accordance with one or more target profiles). The matches for a particular entity may be provided automatically (e.g., via electronic mail or upon logging in to the match-making web site) or in real-time in response to a request received from the entity or a representative (e.g., individual) of the entity. For example, an entity may establish a target profile that defines a set of features and corresponding feature values that are desired in a match for that entity. The server(s) may thereafter identify and/or rank potential matches between entities that are members of the match-making web site.

While the matches may be identified and ranked based upon information in source and target profiles that have been established by entities that are members of the match-making web site, this information is often insufficient to generate matches that are desirable for both entities. The disclosed embodiments enable matches to be identified and/or ranked based at least in part upon implicit indicators of relevance. Implicit indicators of relevance may include behavioral indicators that measure interactions between entities, as will be described in further detail below.

The server(s) 102 may automatically generate and/or update the potential matches for these entities 112, 114, 116 based at least in part on various implicit indicators of relevance. Examples of such implicit indicators of relevance will be described in further detail below. For example, the system may identify and/or rank matches between entities based upon one or more implicit indicators of relevance in combination with information in the respective entity profile(s) and/or target profile(s). Since entities may be matched using information pertinent to their interactions, these matches are more likely to satisfy both entities that are matched. The server(s) 102 may store these matches in a database, or generate and provide them on an as-needed basis.

In match-making systems, two-sided relevance is a natural way of ranking matches. Intuitively, matches that satisfy a given entity's target profile and whose target profile is also satisfied by the given entity's own profile, are preferred to matches whose target profile is not satisfied by the given entity. For an online dating service, consider the situation where user u is interested in someone with attributes similar to those of user v but v is not interested in someone with attributes similar to those of user u. In this case, we argue that it is undesirable for a system to rank v highly for u. There are two reasons for this. First, we would like to avoid v being contacted by undesirable candidates. Second, we would like to maximize the likelihood that u receives a reply.

Figure 2:
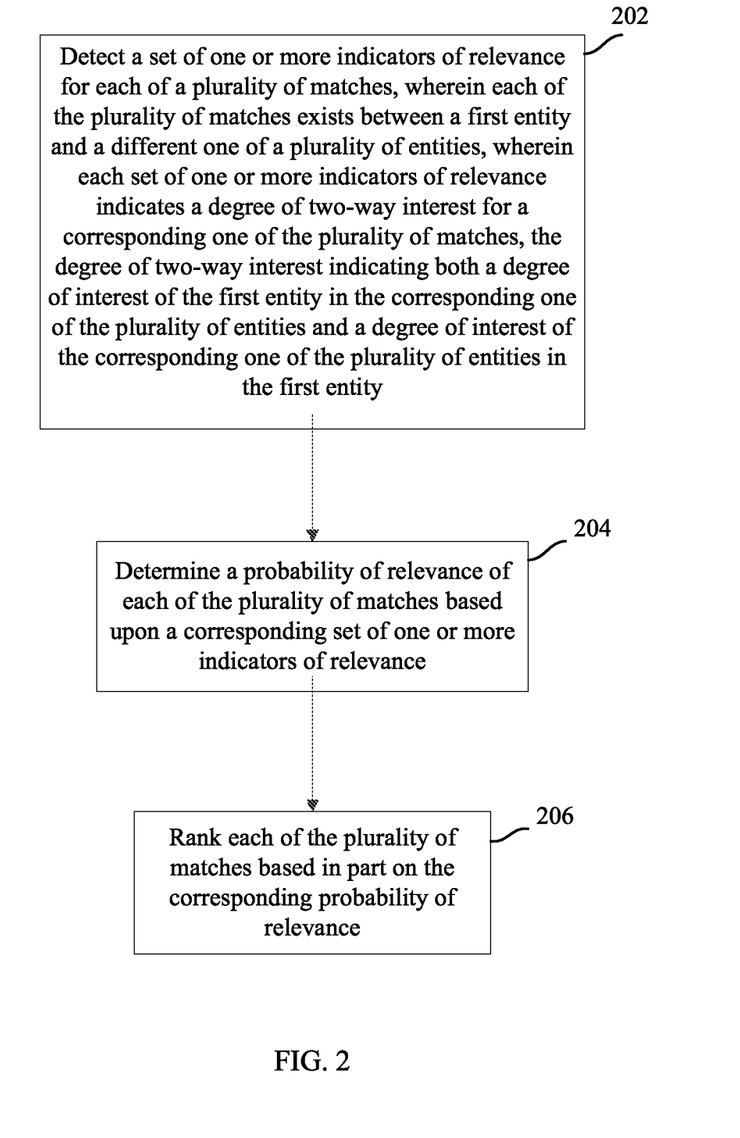
FIG. 2 is a process flow diagram illustrating an example method of matching entities in accordance with various embodiments.

FIG. 2 is a process flow diagram illustrating an example method of matching entities in accordance with various embodiments. A set of one or more indicators of relevance such as behavioral features may be detected at 202 for each of a plurality of matches, where each of the plurality of matches exists between a first entity and a different one of a plurality of entities. Each set of one or more indicators of relevance may indicate a degree of two-way relevance (e.g., two-way interest or appeal) for a corresponding one of the plurality of matches. A degree of two-way relevance may indicate both a degree to which the first entity is relevant to the corresponding one of the plurality of entities and a degree to which the corresponding one of the plurality of entities is relevant to the first entity. For instance, the degree of two-way relevance may indicate both a degree of interest of the first entity in the corresponding one of the plurality of entities and a degree of interest of the corresponding one of the plurality of entities in the first entity. More particularly, the set of one or more indicators of relevance for each of the plurality of matches may measure interactions (e.g., inter-user communications) between the first entity and a corresponding one of the plurality of entities. Inter-user communications may include profile views and/or the transmission of messages by one or both entities of a match pair. Examples of indicators of relevance that may be detected will be described in further detail below with reference to FIG. 3.

A probability of relevance of each of the plurality of matches may be determined based at least in part upon a corresponding set of one or more indicators of relevance at 204. More particularly, the probability of relevance of each of the plurality of matches may be determined based in part on a query of the first entity, features of the first entity, and/or features of a corresponding one of the plurality of entities, in addition to the corresponding set of one or more indicators of relevance.

The plurality of matches may then be ranked based at least in part on the corresponding probability of relevance at 206. Determining relevance and ranking of the plurality of matches may be performed using a ranking model such as a gradient-boosted decision tree (GBDT). In one embodiment, one or more parameters of a ranking model may be ascertained using the probability of relevance of each of the plurality of matches. The ranking model may therefore be trained based at least in part on the probability of relevance of each of the plurality of matches using these parameters. The ranking function may then be used to identify and rank matches for another query and/or different querying entity (e.g., for which behavioral features may be absent) based upon non-communication signals such as features of user profile(s) and/or queries.

Each of the plurality of matches may correspond to a pair of entities. The entities may be individuals, where the first entity is an individual and each of the plurality of entities is a different one of a plurality of individuals. For example, the entities may be members of a web site such as a dating web site. As another example, the entities may be consumers of a particular web site. More particularly, consumers may be matched for purposes of informing them of purchases made by other similarly situated consumers. As yet another example, the entities may include individual(s) and/or group(s) of individuals. More particularly, matches between an employer and a plurality of prospective employees may be identified and/or ranked. Similarly, matches between an employee and a plurality of prospective employers may be identified and/or ranked. Other examples of potential applications of the disclosed embodiments enable an individual to be matched with a plurality web sites or, alternatively, a web site to be matched with a plurality of individuals.

Figure 3:
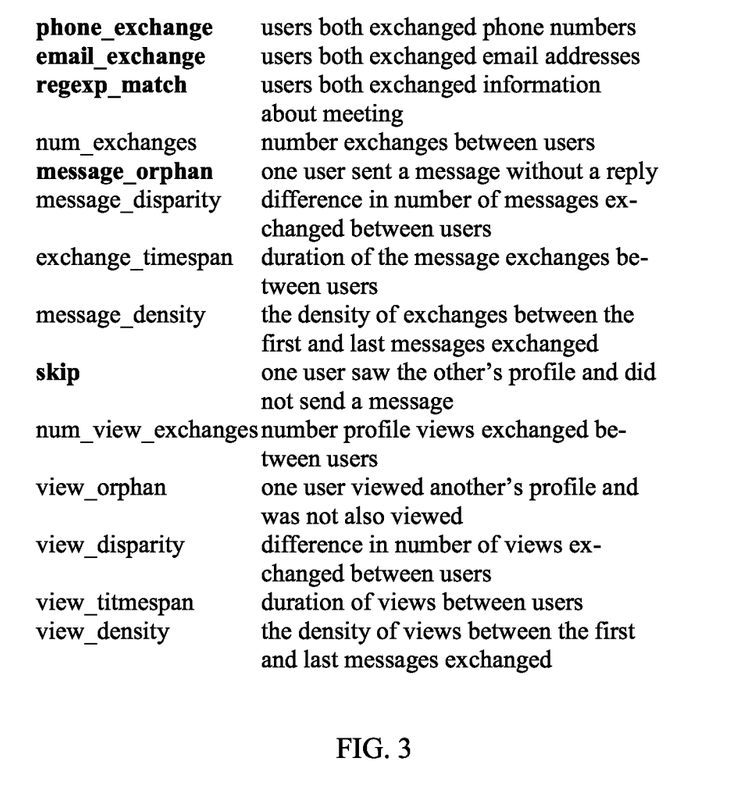
FIG. 3 is a table presenting example features that may be used to determine two-way relevance of a match between two entities in accordance with various embodiments.

FIG. 3 is a table presenting example features (i.e., indicators of relevance) that may be used to determine (or predict) relevance of a match between two entities in accordance with various embodiments. The examples described below are set forth with respect to a dating web site. However, it is important to note that these examples may also apply to other types of match-making systems or web sites.

Features indicating and/or predicting two-way relevance of a match between two entities may measure the interactions (or lack thereof) between the two entities. More particularly, one or more of these features may measure the interactions (or lack thereof) between two different entities after a profile of a first one of the two entities has been viewed by a second one of the two entities. In one embodiment, the features may be "implicit" indicators of relevance. In other words, the features do not identify or otherwise indicate direct click feedback from either of the entities.

A feature indicating two-way relevance (or lack thereof) may identify a particular interaction (or lack thereof) and/or a number of interactions between two entities. More particularly, a one-way interaction between two entities that does not have a corresponding two-way interaction between the two entities may indicate the lack of two-way relevance. A feature may identify a one-way interaction between two entities that does not have a corresponding two-way interaction between the two entities. Similarly, a feature may indicate a number of one-way interactions between two entities that do not have corresponding two-way interactions between the two entities.

The following are examples of one-way interactions between a first entity and one of a plurality of entities: 1) the first entity sent a message to one of the plurality of entities and the one of the plurality of entities did not send a reply to the first entity; 2) one of the plurality of entities sent a message to the first entity and the first entity did not send a reply to the one of the plurality of entities; 3) the first entity viewed a profile of one of the plurality of entities and the one of the plurality of entities did not view a profile of the first entity; and 4) one of the plurality of entities viewed a profile of the first entity and the first entity did not view a profile of the one of the plurality of entities. (Many match-making systems notify an entity when their profile has been viewed by another entity.)

Conversely, various features may be predictive of two-way relevance. More particularly, a two-way interaction between two entities may indicate or predict two-way relevance. A two-way interaction between a first entity and one of a plurality of entities may include a first interaction (e.g., message and/or profile view) initiated by the first entity and a second interaction (e.g., message and/or profile view) initiated by the one of the plurality of entities (or vice versa). Thus, a feature may identify a two-way interaction (e.g., exchange) between the two entities and/or indicate a number of two-way interactions (e.g., exchanges) between the two entities. For instance, an exchange may be an exchange of messages or an exchange of profile views.

The following are examples of two-way interactions (e.g., messages) between a first entity and one of a plurality of entities: 1) an exchange of phone numbers of both the first entity and the corresponding one of the plurality of entities; 2) an exchange of electronic mail addresses of both the first entity and the corresponding one of the plurality of entities; and 3) an exchange of information pertaining to a meeting between the first entity and a corresponding one of the plurality of entities.

Where two-way interactions exist between two entities (e.g., a first entity and one of a plurality of entities), there may be a difference between the number of messages (or views) initiated by the first entity and the number of messages (or views) initiated by one of the plurality of entities. For example, a feature predictive of two-way relevance may indicate a difference in (or otherwise identify) a number of messages sent by the first entity to one of the plurality of entities and a number of messages sent by the one of the plurality of entities to the first entity. As another example, a feature predictive of two-way relevance may indicate a difference in (or otherwise identify) a number of times that the first entity viewed a profile of one of the plurality of entities and a number of times that the one of the plurality of entities viewed a profile of the first entity.

Other features that may be predictive of two-way relevance (or lack thereof) of a match between a first entity and a corresponding one of a plurality of entities include: a time period during which the first entity and the one of the plurality of entities exchange messages; 2) a time period during which the first entity and the one of the plurality of entities exchange profile views; 3) a density of messages exchanged between the first entity and a corresponding one of the plurality of entities after a first message has been exchanged between the first entity and the corresponding one of the plurality of entities; and 4) a density of profile views exchanged by the first entity and the corresponding one of the plurality of entities after a first message has been exchanged between the first entity and the corresponding one of the plurality of entities.

Similarly, other features that may indicate the lack of two-way relevance between a first entity and a corresponding one of a plurality of entities include: 1) the first entity viewed a profile of a corresponding one of the plurality of entities but did not send a message to the one of the plurality of entities; and 2) the one of the plurality of entities viewed a profile of the first entity but did not send a message to the first entity.

Different ranking functions may be used to determine the relevance (e.g., two-way relevance) of a match, as well as rank a plurality of matches according to the degree of relevance (e.g., two-way relevance) of those matches. An interesting aspect of match-making systems such as online dating web sites is subjective relevance. Understanding the two-way relevance of a pair of entities often requires a complex understanding of the intents of both entities. This makes a good match more difficult to detect than document relevance and as a result is particularly interesting from an information retrieval perspective. In one embodiment, an information retrieval-based ranking function may be used to determine two-way relevance of a plurality of matches, as well as rank the plurality of matches. An example of the application of an information retrieval-based ranking function to identify and rank a plurality of matches based upon two-way relevance will be described in further detail below.

Problem Definition

We consider a retrieval scenario consisting of a set of entities (e.g., users), U, each of whom maintains a self-description (i.e, profile) and a query (e.g., representing a target profile). For a user u∈U, a description, $d_u$, consists of a set of descriptive attributes. These attributes may be binary, scalar, categorical, and/or free text. For example, binary attributes may indicate whether the user is a smoker and/or whether the user has children. Scalar attributes may indicate, for example, age, height, weight, income, number of children, and/or number of photos. Examples of categorical attributes include body type, city, country, whether the user wants more children, the amount the user drinks, education, employment, ethnicity, eye color, gender, hair color, humor style, interests, languages, living situation, marital status, whether the user is a new user of the web site (or the amount of time the user has been a member of the web site), occupation, personality type, political bent, religion religious activity, romantic style, sexuality, smoking (e.g., amount the user smokes), social style, astrological sign, state, subscription status, television viewing style, and zip code.

A query, $q_u$, may define an ideal match in terms of a set of constraints (e.g., preferences) on attribute values (e.g., scalar and categorical attributes) that are desired of a potential "matching" entity. Those entities that are potential matches may be referred to as candidates. Each of the set of constraints of a query may be binary, scalar, or categorical. Binary constraints may indicate that a certain attribute be present in a candidate record or profile. Scalar constraints may indicate that a scalar attribute of a candidate profile be a certain value or in a certain range. Categorical constraints may indicate that a certain categorical attribute of a candidate profile be a certain category of a plurality of categories.

For each user, u, we would like to rank all other users, $v \in U - \{u\}$, such that relevant matches occur above non-relevant candidates. In the following description, the examples refer to users in order to simplify the description. However, it is important to note that the disclosed embodiments may equally apply to identify and/or rank matches for entities, regardless of whether the entities are single users or other entities.

Ranking for Match-Making Systems

In one embodiment, the ranking model that is implemented may be a machine learned ranking model. Machine learned ranking models typically consist of three parts: ranking features, relevance, and a ranking function. Ranking features may include all signals we observe which may influence the scoring of a candidate match. Relevance refers to two entities being an appropriate match (e.g. they want to meet). Finally, the ranking function is a model of relevance given observable ranking features.

Ranking Features

Given an entity's query, we can rank all other entities in decreasing order of two-way relevance. Three types of features (e.g., attributes) may be predictive of relevance.

A first set of features may be extracted from entity profiles (e.g., user profiles). The user profiles may each represent information about a given user. Profiles typically only specify a single value for a given attribute rather than multiple values. This is due to the fact that users have a single age, a single body type, a single astrological sign, and so on. When ranking for a particular user, u, the profile features of a candidate, v, can be thought of as independent of user u and the query (e.g., target profile). We can represent a candidate entity's profile features with the notation $\bar{d}$ (e.g., 330 features), a querier entity's profile features with $\vec{d}$ (e.g., 330 features), and the concatenation of both sets as $\ddot{d}$ (e.g., 660 features).

A second set of features may compare pairs of entity (e.g., user) profiles. We expect that match relevance will be influenced when some profile features are very different (e.g. age). We can compare two profiles in a match by comparing the individual profile features, $\vec{d}$ and $\bar{d}$, as, $$\delta_i = |\vec{d}_i - \bar{d}_i| \quad \text{scalar features}$$

$$\delta_i = \vec{d}_i \oplus \bar{d}_i \quad \text{binary features}$$

We can also implement a simple score comparing the similarity of pairs of entities' text self-description. For each user u, we can compute an $l_2$-normalized tf.idf-based term vector, $t_u$, based on the self-description. Given a pair of users, the text comparison is, $$\delta_{text} = \langle t_u, t_v \rangle$$

Notice that, unlike the non-text feature comparison, the text comparison is a similarity as opposed to a difference. This is a minor issue since our modeling should be able to support both types of features. We can present a pair's comparison of features (e.g., both textual and non-textual) with $\delta$ (331 features).

A final set of features may represent those attributes of a candidate profile for which values match a user's query, which may be referred to as match features. For example, for scalar attributes, a query can specify a range of values of interest, such as ages between 18 and 35. These ranges may be transformed into two scalar features, one representing the minimum allowable value and the other representing the maximum. In our age example, this would correspond to the features age_min=18 and age_max=35. With categorical attributes, a query can specify one or more desirable values for each attribute. These preferences are encoded as binary features, one for each possible attribute value. For example, if a user is interested in matches with red or blonde hair, then the features hair_red and hair_blonde may be set to true (1) and all other hair color features (e.g., hair_black) may be set to false (0). Finally, users can specify the importance of each attribute (e.g., in their query or profile). The possible options are "must match", "nice to match", and "any match". Here, "must match" attributes are those that the querier requires to be satisfied for a match to be relevant, "nice to match" are those attributes that the user would like to match, but does not require, and "any match" means the user would be satisfied with any match for the given attribute. These attribute importances may be encoded as binary features (e.g., hair_must_match, hair_nice_to_match, and hair_any_match). A set of match features can represent how well each attribute matches between a user's query and a candidate profile, as well as the importance of the attribute preferences of the querier. For example, if a querier is interested in matches with a given hair color, a match feature can encode whether a candidate's profile attribute satisfied that hair color as well as the importance of that attribute match. Match features of this form can be extracted for all query attributes. We may represent a candidate's match features with respect to a querier's query with the notation $\bar{q}q$ (e.g., 156 features), a querier's match features with respect to the candidates query with $\vec{q}$ (e.g., 156 features), and the concatenation of both sets as $\ddot{q}q$ (e.g., 312 features).

Relevance

Relevance is often interpreted as topical relevance. When interpreted this way, some degree of editorial assessment of document relevance can be performed. In a matchmaking system, queries are often constrained to a small set of structured attributes. Therefore, asking an editor to detect two-sided relevance can be a more time-consuming task; the editor would need to determine the intent of a querier given a structured query as well as a potentially rich profile in both directions. Furthermore, in many cases, the relevance of matches in a match-making system is more subjective than topical relevance. For example, there may be many subtle attributes in the profile or query which are important to the users but difficult to detect, even with query attribute preferences. Because of this, accurately determining intent and relevance may be impossible.

In order to address the difficulty with editorial relevance assessment, a retrieval system can use behavioral information of a running system to detect when entities (e.g., users) have found relevant information. This approach is often practiced in web search when relevance engineers monitor user click-through patterns. Because salient behavioral information normally occurs after a query is issued, we may refer to these behavioral signals as post-presentation signals. In one embodiment, we may tune ranking function parameters using queries with post-presentation signals and generalize the tuned ranking function parameters to queries with no post-presentation signals. Similarly, we can tune ranking function parameters using various indicators of relevance and generalize the tuned ranking function to situations that lack such indicators of relevance, regardless of whether a query has been issued. Various examples of various post-presentation signals (e.g., indicators of two-way relevance) were previously described above with reference to FIG. 3.

Match-making systems can provide a unique set of post-presentation relevance signals which can be used both for training and evaluation. For example, if two users exchange phone numbers, they are probably a good match. On the other hand, if one user's message never receives a reply, then they were probably a poor match.

Instead of committing to a single feature to define relevance, we can apply a number of features or rules to define relevance and non-relevance for matches. More particularly, various features may provide a plurality of indicators of relevance or non-relevance, as discussed above with reference to FIG. 3. For example, we can consider relevant any matches where users exchanged contact information. Similarly, we can consider as non-relevant any matches where at least one user inspected the other's profile but did not send a message as well as any matches where one user sent a message but the other did not reply. We may refer to matches having one or more of these features as 'labeled' matches.

Given the large number of matches, we propose to label a small number of them and use the labeled matches to predict the labels of other unlabeled ones. Hence, using a small set of (automatically) labeled matches, we can train a ranking model. This training aims to predict the presence of features that correlate with relevance (or non-relevance) in unlabeled matches. Specifically, we train a ranking model using indicators of relevance such as those described above with reference to FIG. 3, as well features of the pertinent entity profiles. Further features such as the query of the querying entity u and/or queries of candidate entities v may also be used to train a ranking model. We can then use this trained ranking model to label unlabeled matches with predicted relevance (e.g., two-way relevance). For a match of users u and v, we use the notation P(R|u, v) to refer to the predicted relevance (e.g., probability of predicted relevance). We can force labeled matches to have P(R|u, v)∈{0, 1} based on the automatic labeling.

Of course, predicted relevance is a noisy signal. For example, a successful interaction will not be detected if messages are exchanged through an external protocol. Furthermore, even when messages are exchanged within a system, it may be that the match is inappropriate. Messaging is also subject to false negatives if contacts are not initiated due a searcher's perceived probability of response. However, basing relevance for a match-making system such as a dating system on behavioral information such as those features described above with reference to FIG. 3 is likely to be more reliable and more efficient than editorial labeling.

Ranking Function

There are many different ways to define a ranking function for a match-making task. In one embodiment, a machine learned ranking function based on gradient boosted decision trees (GBDTs) is used to identify and rank matches. GBDTs may be desirable for use in the context of match-making for several reasons. First, GBDTs can handle both numerical and categorical features, which is a good fit for the types of attributes found in match-making systems. Second, GBDT based ranking functions can be trained using a wide variety of relevance sources, including manual labels and click-through data. Finally, these models have been shown to be highly effective for learning ranking functions.

We now provide a basic overview of GBDTs. Given a query of u and a candidate match v, we can use GBDTs to compute a relevance score for the pair. As the name implies, GBDTs are boosted regression trees. Let $f_{u,v}$ be a feature vector associated with the pair (u, v) that identifies features of the corresponding pair. More particularly, the features of the feature vector may be "labeled" behavioral features such as those described above with reference to FIG. 3. The features of the feature vector may also include one or more types of features such as those described above. More particularly, the features of the feature vector may include features of one or both profiles of a match pair (e.g., features of the querying entity u and/or features of a candidate match v), features of a candidate match v that match values of a query of u, features of u that match values of a query of v, features comparing features of both profiles, and/or "match features"). A regression tree defines a function T(u, v) by partitioning the space of feature values into disjoint regions $R_j$, j=1, 2, . . . , J, which are associated with the terminal nodes of the tree. Each region is assigned a value $\Phi_j$ such that T(u, v)=$\Phi_j$ if $f_{u,v} \in R_j$. Thus, the output of the regression tree may be computed as:

$$T(u, v; \Theta) = \sum_{j=1}^{J} \phi_j I(f_{u,v} \in R_j), \quad (1)$$

where $\Theta = \{R_j, \phi_j\}_1^J$, are parameters and I is the indicator function. Given a pair of users, a single regression tree will return a single real-valued score for that pair of users. Precisely how the score is computed depends on the model parameters $R_j$ and $\Phi_j$.

For a given loss function L these model parameters may be estimated by minimizing the total loss:

$$\hat{\Theta} = \arg\min_{\Theta} \sum_{j=1}^{J} \sum_{f_{u,v} \in R_j} L(y_{u,v}, \phi_j). \quad (2)$$

where $y_{u,v}$=P(R|u,v) is the actual or predicted relevance label for pair (u, v). Numerous heuristics exist for solving this optimization problem. Moreover, the loss function L may include a mean squared error function.

A boosted regression tree is an aggregate of such trees, each of which is computed in a sequence of stages. That is, $$s_M(u, v) = \sum_{m=1}^{M} T(u, v; \Theta_m), \quad (3)$$

where at each stage m, $\theta_m$ is estimated to fit the residuals from stage m−1 as follows:

$$\hat{\Theta}_m = \underset{\Theta_m}{\operatorname{argmin}} \sum_{(u,v)} L(y_{u,v}, s_{m-1}(u, v) + \rho\phi_{j_m}). \quad (4)$$

where p is a free parameter known as the shrinkage rate. Another important free parameter is the depth of the individual regression trees T. If the depth of the trees is greater than 1, then interactions between features may be taken into account.

Thus, given a training set consisting of pairs of users and their associated relevance labels, we can learn a GBDT model, model $\{\theta_i\}_{i=1}^M$, which is an ensemble of regression trees. At test time, we may use the learned model to score, and subsequently rank, candidate matches (e.g., matching entities) v with respect to queriers (e.g., querying entities) u using $s_M(u,v)$.

Furthermore, the GBDT algorithm may also provide what is referred to as feature importance. More particularly, the feature importance may be computed by keeping track of the reduction in the loss function at each feature variable split and then computing the total reduction of loss function along each feature variable. In the GBDT model, each node in a regression tree represents a feature variable split at which each path down the tree from the node represents a different value of the feature variable. For example, a feature variable split may be based on the gender feature variable, where one path is followed down the tree from the node if the value of the gender feature variable equals male, but a different path is followed down the tree from the node it the value of the gender feature variable equals female. The feature importance can be useful for analyzing which features contribute the most to the learned model.

Training

Parameters of GBDT models may be estimated using different subsets, as well as combinations of two or more subsets of features regressing against P(R|u, v). More particularly, examples of these subsets of features may be labeled $\vec{q}$ (match only), $\vec{d}$ (candidate profile only), $\delta$ (profile similarity only), and $\vec{q}\,q$ (two-way match only). Because of unbalanced class distributions, we can weigh each of the plurality of matches (i.e., match instances) according to, $$w_{u<v} = \begin{cases} \dfrac{1}{|\mathcal{U}_{P(R|u,v)=1}|} & P(R \mid u, v) = 1 \\ \dfrac{1}{|\mathcal{U}_{P(R|u,v)=0}|} & P(R \mid u, v) = 1 \\ \dfrac{1}{|\mathcal{U}_{0<P(R|u,v)<1}|} & 0 < P(R \mid u, v) < 1 \end{cases}$$

so that we give a match weight according the source of its label (e.g., the subset of features from which the actual or predicted relevance is ascertained). Accordingly, each of the matches may be assigned a weight based upon the probability of relevance and source of the features used to calculate the probability of relevance.

Once the weights have been ascertained, the ranking function may be modified using these weights to identify and rank matches based upon feature importance. In this manner, it is possible to predict relevance (e.g., two-way relevance or inter-user communication) using non-communication signals (e.g., based on queries and/or profiles) in accordance with the determined feature importance.

Gradient-boosted decision trees have several free parameters: number of trees, number of nodes, and shrinkage. The decision trees may be trained using the training partition (e.g., a set of labeled matches) and selected free parameters using the validation set (e.g., a set of labeled matches that are relevant), exploring ranges of free parameter values, such as:
  number of nodes {1, 2, 3, 4, 5, 6, 7, 8, 9, 10, 25, 50}
  number of trees {5, 10, 50, 75, 100, 250, 500, 1000}
  shrinkage {0.01, 0.025, 0.05, 0.075, 0.10, 0.15, 0.25, 0.50}

Since the validation set is a set of matches that are known to satisfy the target profile of a requester, the validation set can be used to check the accuracy of the ranking model.

Figure 4:
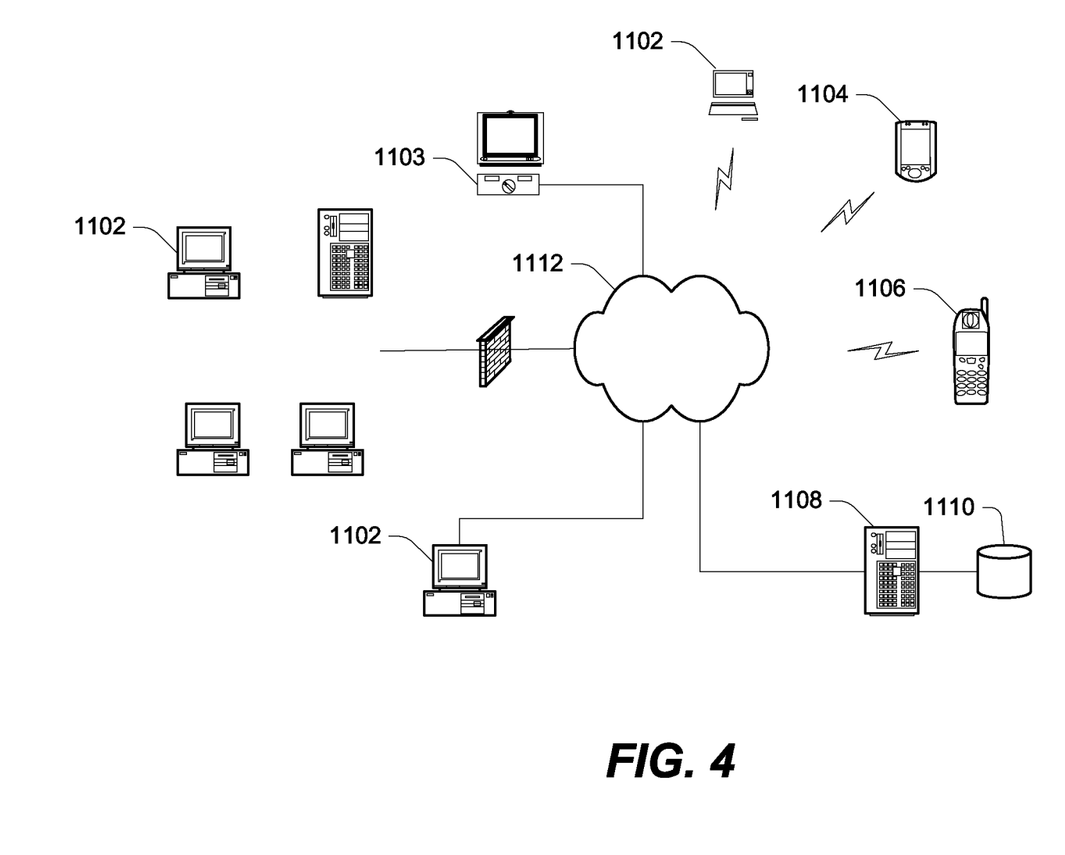
FIG. 4 is a simplified diagram of an example network environment in which various embodiments may be implemented.

The disclosed embodiments may be implemented in any of a wide variety of computing contexts. For example, as illustrated in FIG. 4, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, a query (e.g., target profile) may be obtained via a graphical user interface from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

A list of matches (e.g., identification of a plurality of entities and/or associated profiles) may be provided according to the disclosed embodiments in some centralized manner. This is represented in FIG. 4 by server 1108 and data store 1110 which, as will be understood, may correspond to multiple distributed devices and data stores. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, categories or content types to be displayed in association with the disclosed methods, search results, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 5:
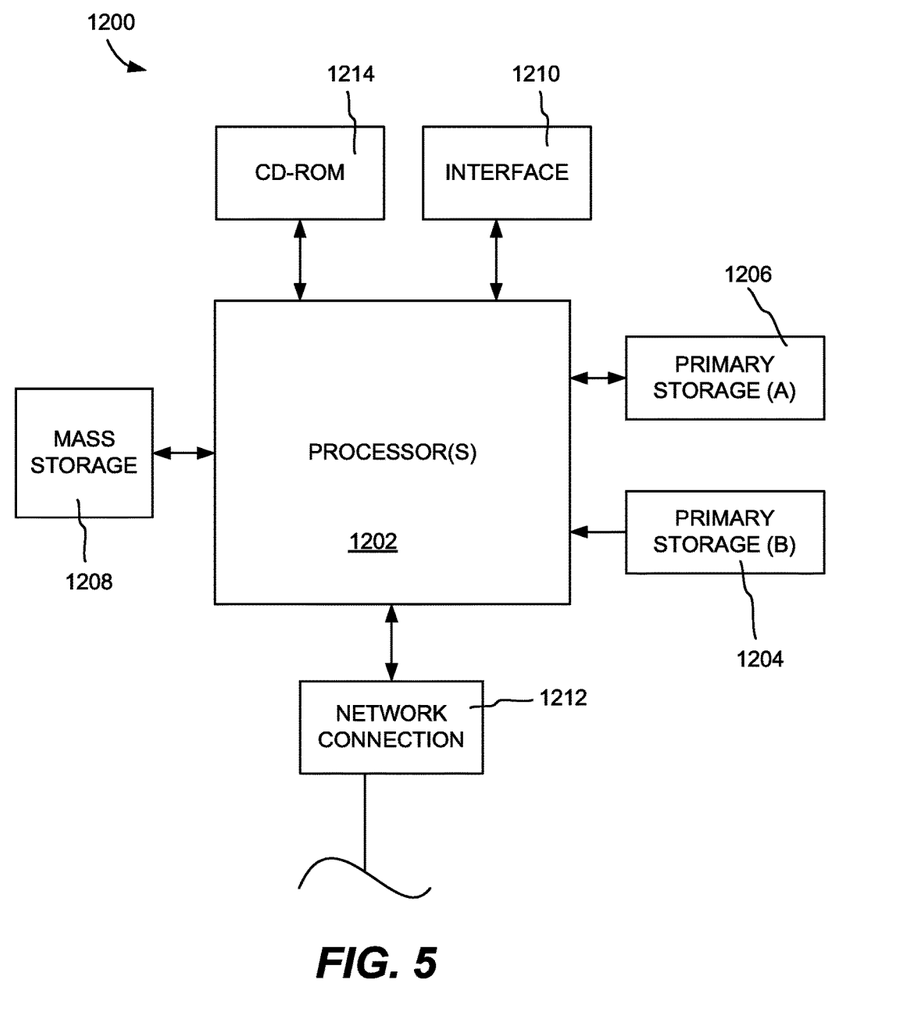
FIG. 5 illustrates an example computer system in which various embodiments may be implemented.

FIG. 5 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
    receiving, from a mobile device associated with a dating profile of a dating website, a query identifying constraints on attributes of a target dating profile;
    retrieving, from the dating website, unlabeled matches based on the query, wherein each of the unlabeled matches comprises a pairing between the dating profile and a candidate dating profile that satisfies the constraints on the attributes, wherein each of the unlabeled matches lacks behavioral features, which indicate whether a match is relevant, wherein the behavioral features comprise:
        click feedback from either of the dating profile and the candidate dating profile,
        a first duration of profile views initiated by the dating profile toward the candidate dating profile, and
        a second duration of profile views initiated by the candidate dating profile toward the dating profile; and
    identifying relevant ones of the unlabeled matches utilizing ranking features of each of the unlabeled matches as a proxy for the behavioral features by:
        retrieving labeled matches from the dating website, wherein each of the labeled matches comprises a pairing between two dating profiles from the dating website, wherein each of the labeled matches is labeled with a probability of relevance based on the behavioral features of the two dating profiles, wherein:
            the probability of relevance identifies a relevant match as ones of the labeled matches in which the two dating profiles have exchanged contact info, and
            the probability of relevance identifies a non-relevant match as:
                ones of the labeled matches in which a first dating profile of the two dating profiles accessed a second dating profile of the two dating profiles but did not send a message to the second dating profile, or
                ones of the labeled matches in which the first dating profile sent a message to the second dating profile but the second dating profile did not send a message to the first dating profile;
        generating, from the labeled matches, a ranking model that correlates the probability of relevance to ranking features of each of the labeled matches; wherein the ranking model is configured to receive, as input, the ranking features of each of the labeled matches and generate, as output, the probability of relevance;
        calculating the probability of relevance of each of the unlabeled matches by inputting, into the ranking model, ranking features of each of the unlabeled matches and retrieving, from the ranking model, the probability of relevance of each of the unlabeled matches, wherein the probability of relevance of each of the unlabeled matches is calculated due at least in part to the each of the unlabeled matches lacking the behavioral features;

calculating a rank for each of the unlabeled matches based on the probability of relevance of each of the unlabeled matches to generate a set of ranked matches; and identifying, to the dating profile, the relevant ones of the unlabeled matches by transmitting at least a portion of the set of ranked matches to the mobile device associated with the dating profile.

2. The method of claim 1, further comprising: generating the ranking features of each of the labeled matches from the two dating profiles, wherein the ranking features comprise a vector of attributes from each of the two dating profiles.

3. The method of claim 1, further comprising: generating the ranking features of each of the unlabeled matches from the dating profile and the candidate dating profile, wherein the ranking features comprise a vector of attributes from the dating profile and the candidate dating profile.

4. The method of claim 1, wherein the ranking model comprises a ranking function generated based on one or more regression trees.

5. The method of claim 1, wherein the probability of relevance is one for each relevant match and the probability of relevance is zero for each non-relevant match.

6. A server comprising:
a memory storing data associated with a dating website; and
at least one of processor that performs operations comprising:
receiving, from a mobile device associated with a dating profile of a dating website, a query identifying constraints on attributes of a target dating profile;
retrieving, from the memory, unlabeled matches based on the query, wherein each of the unlabeled matches comprises a pairing between the dating profile and a candidate dating profile that satisfies the constraints on the attributes, wherein each of the unlabeled matches lacks behavioral features, which indicate whether a match is relevant, wherein the behavioral features comprise:
click feedback from either of the dating profile and a candidate dating profile,
a first duration of profile views initiated by the dating profile toward the candidate dating profile, and
a second duration of profile views initiated by the candidate dating profile toward the dating profile; and
identifying relevant ones of the unlabeled matches utilizing ranking features of each of the unlabeled matches as a proxy for the behavioral features by:
retrieving labeled matches from the memory, wherein each of the labeled matches comprises a pairing between two dating profiles from the dating website, wherein each of the labeled matches is labeled with a probability of relevance based on the behavioral features of the two dating profiles, wherein:
the probability of relevance identifies a relevant match as ones of the labeled matches in which the two dating profiles have exchanged contact info, and the probability of relevance identifies a non-relevant match as:
ones of the labeled matches in which a first dating profile of the two dating profiles accessed a second dating profile of the two dating profiles but did not send a message to the second dating profile, or
ones of the labeled matches in which the first dating profile sent a message to the second dating profile but the second dating profile did not send a message to the first dating profile;
generating, from the labeled matches, a ranking model that correlates the probability of relevance to ranking features of each of the labeled matches; wherein the ranking model is configured to receive, as input, the ranking features of each of the labeled matches and generate, as output, the probability of relevance;
calculating the probability of relevance of each of the unlabeled matches by inputting, into the ranking model, ranking features of each of the unlabeled matches and retrieving, from the ranking model, the probability of relevance of each of the unlabeled matches, wherein the probability of relevance of each of the unlabeled matches is calculated due at least in part to the each of the unlabeled matches lacking the behavioral features;
calculating a rank for each of the unlabeled matches based on the probability of relevance of each of the unlabeled matches to generate a set of ranked matches; and
identifying, to the dating profile, the relevant ones of the unlabeled matches by transmitting at least a portion of the set of ranked matches to the mobile device associated with the dating profile.

7. The server of claim 6, wherein the operations further comprise:
generating the ranking features of each of the labeled matches from the two dating profiles, wherein the ranking features comprise a vector of attributes from each of the two dating profiles.

8. The server of claim 6, wherein the operations further comprise
generating the ranking features of each of the unlabeled matches from the dating profile and the candidate dating profile, wherein the ranking features comprise a vector of attributes from the dating profile and the candidate dating profile.

9. The server of claim 6, wherein the ranking model comprises a ranking function generated based on one or more regression trees.

10. The server of claim 6, wherein the probability of relevance is one for each relevant match and the probability of relevance is zero for each non-relevant match.

11. A non-transitory computer-readable medium comprising instructions, that when executed by at least one processor, configure the at least one processor to perform operations comprising:
receiving, from a mobile device associated with a dating profile of a dating website, a query identifying constraints on attributes of a target dating profile;
retrieving, from the dating website, unlabeled matches based on the query, wherein each of the unlabeled matches comprises a pairing between the dating profile and a candidate dating profile that satisfies the constraints on the attributes, wherein each of the unlabeled matches lacks behavioral features, which indicate whether a match is relevant, wherein the behavioral features comprise:

click feedback from either of the dating profile and a candidate dating profile, a first duration of profile views initiated by the dating profile toward the candidate dating profile, and a second duration of profile views initiated by the candidate dating profile toward the dating profile; and identifying relevant ones of the unlabeled matches utilizing ranking features of each of the unlabeled matches as a proxy for the behavioral features by:

retrieving labeled matches from the dating website, wherein each of the labeled matches comprises a pairing between two dating profiles from the dating website, wherein each of the labeled matches is labeled with a probability of relevance based on the behavioral features of the two dating profiles, wherein:

the probability of relevance identifies a relevant match as ones of the labeled matches in which the two dating profiles have exchanged contact info, and the probability of relevance identifies a non-relevant match as:

ones of the labeled matches in which a first dating profile of the two dating profiles accessed a second dating profile of the two dating profiles but did not send a message to the second dating profile, or ones of the labeled matches in which the first dating profile sent a message to the second dating profile but the second dating profile did not send a message to the first dating profile;

generating, from the labeled matches, a ranking model that correlates the probability of relevance to ranking features of each of the labeled matches; wherein the ranking model is configured to receive, as input, the ranking features of each of the labeled matches and generate, as output, the probability of relevance;

calculating the probability of relevance of each of the unlabeled matches by inputting, into the ranking model, ranking features of each of the unlabeled matches and retrieving, from the ranking model, the probability of relevance of each of the unlabeled matches, wherein the probability of relevance of each of the unlabeled matches is calculated due at least in part to the each of the unlabeled matches lacking the behavioral features;

calculating a rank for each of the unlabeled matches based on the probability of relevance of each of the unlabeled matches to generate a set of ranked matches; and identifying, to the dating profile, the relevant ones of the unlabeled matches by transmitting at least a portion of the set of ranked matches to the mobile device associated with the dating profile.

12. The non-transitory computer-readable medium of claim 11, wherein the operations further comprise: generating the ranking features of each of the labeled matches from the two dating profiles, wherein the ranking features comprise a vector of attributes from each of the two dating profiles.

13. The non-transitory computer-readable medium of claim 11, wherein the operations further comprise: generating the ranking features of each of the unlabeled matches from the dating profile and the candidate dating profile, wherein the ranking features comprise a vector of attributes from the dating profile and the candidate dating profile.

14. The non-transitory computer-readable medium of claim 11, wherein the ranking model comprises a ranking function generated based on one or more regression trees.

\* \* \* \* \*